3,168,403
FLOCCULATED GELATINE EMULSIONS CONTAINING SULPHONATED COPOLYMERS OF STYRENE

Wolfgang Himmelmann and Helmut Mäder, Leverkusen, Rolf-Fred Posse, Cologne-Flittard, and Hans Ulrich, Leverkusen, Germany, assignors to Agfa Aktiengesellschaft, Leverkusen, Germany, a corporation of Germany
No Drawing. Filed Jan. 3, 1962, Ser. No. 164,193
Claims priority, application Germany, Jan. 10, 1961,
A 36,460
9 Claims. (Cl. 96—114)

The invention relates to new silver halide gelatine emulsions as well as to a process for the production of said emulsions.

According to the conventional method the emulsion, after the precipitation of the silver halide, is solidified in gelatine, is cut into pieces and freed from soluble salts by washing with cold water. Thereafter, the gel, the volume of which has increased considerably by taking up water, must be melted again.

According to more recent processes an emulsion with a higher silver halide content is precipitated by adding a precipitant, separated from the aqueous solution, again washed with water and, after adding more gelatine or aqueous gelatin solution adjusted to the required concentration. With this process, by comparison with the previously described conventional process, the cutting and time-consuming washing of the shredded gelatine are obviated. Furthermore, this process makes it possible for the emulsion to be varied in many respects and leads in a number of cases to an improvement in the photographic properties of the emulsion.

The processes employing this principle are primarily differentiated by the nature of the precipitant. Flocculation is generally effected by salts, in the simplest case by means of sodium sulphate. The disadvantage of this method lies in the great excess of salt which is necessary for an adequate precipitation. Apart from this, these precipitates cannot be washed out with water, since they are readily dissolved. Therefore, after precipitation and melting, emulsions are obtained with high conductivity due to ions which are not washed out. It has also been proposed to use organic liquids which are miscible with water and in which gelatine is insoluble for flocculating the gelatine. The disadvantage of this method lies in the fact that large quantities of organic solvents are required and that several salts are simultaneously precipitated. By this means, only a small percentage of the salts is removed. In addition, it is not possible to wash out the coagulate, since it is dissolved again on adding water. Methods which improve the washing of such emulsions have likewise been described. However, the major disadvantages of danger of fire and high cost of the solvents still remain.

Another method of flocculating emulsions consists in chemically varying the gelatine, it being, for example, possible to react gelatine in suitably diluted form with phthalic acid anhydride. In this way, gelatine derivatives are obtained which can be precipitated at pH values in the region of 3. However, the production of these gelatine derivatives often leads to difficulties. In addition once emulsion recipes have been prepared, they cannot be readily transferred to gelatine derivatives, since the gelatines undergo radical changes in their constitution during such a reaction. There have in addition been described as flocculating agents, compounds which either form complexes with the gelatine or themselves are insoluble at certain pH values the precipitation of which causes simultaneous flocculation of the gelatine. For example, alkyl-sulphonic acids with a relatively high number of carbon atoms have been proposed. They form complexes with the gelatine which are insoluble at pH 2–3. The large amounts of the sulphonic acids which are added and the relatively low pH of the precipitation are however disadvantageous. With many emulsions and especially those which are of high sensitivity, this process leads to a loss of sensitivity. Acid-insoluble compounds of high molecular weight containing carboxyl groups have also been proposed as flocculants. In this case, the relatively low flocculation pH and the changes in the physical properties of the gelatine, for example the water permeability, the high degree of swelling, the modified adhesion and the bad re-dispersibility are disadvantageous. Polystyrene-sulphonic acids of low molecular weight are also known as precipitants but these also are not suitable for emulsions of extremely high sensitivity, since the pH value must also here be lowered to 4–5. Polystyrene-sulphonic acids of high molecular weight have also been used for this purpose (German Patent 912,778). These compounds are added to the photographic layers in order to obtain antistatic film material. However, these acids are disadvantageous too, since the aqueous solutions of the polystyrene sulphonic acids of high molecular weight, prepared with chlorosulphonic acid or sulphuric acid, are of extremely high viscosity and consequently are difficult to mix homogeneously with the gelatin. In addition, they are not compatible with gelatine within wide limits, so that turbid layers are often obtained after the drying.

It is among the objects of the present invention to avoid the disadvantages of the processes mentioned above.

We now have found that silver halide emulsions prepared in the usual manner, more especially emulsions with a high silver halide content and low gelatine content are directly precipitated in the pH range of 6–9 by addition of water-soluble, sulphonated copolymers of high molecular weight which are obtained from styrene or substituted styrene derivatives with other polymerizable vinyl compounds, without addition of acids or salts or organic liquids which are miscible with water. The flocculants according to the invention also precipitate at lower pH values, up to pH 4, but it is advisable, for the reasons mentioned above, to work at high pH values between 6–9, the adjustment to pH values above 7 being possible by adding alkalis. The precipitants according to the invention are prepared by polymerizing styrene or substituted styrenes with at least one polymerizable monomer such as (I) acrylic acid or derivatives thereof e.g. acrylonitrile, acrylic acid esters, preferably those with aliphatic alcohols having up to 5 carbon atoms or acryl amide, (II) methacrylic acid or derivatives thereof such as methacrylonitrile, methacrylic acid esters with aliphatic alcohols having up to 5 carbon atoms or methacryl amide, and (III) vinyl pyrrolidone. The resulting copolymers should contain 97–70 percent styrene and 3–30 percent of the other vinyl compound. According to a preferred embodiment of our invention, the copolymer consists of 97–85 percent of styrene and 3–15 percent of the other vinyl compound.

The polymerization can be carried out in homogeneous solution with benzoyl peroxide or in emulsion with potassium persulphate and bisulphite as catalyst. The products obtained are sulphonated with sulphur trioxide or sulphuric acid (sulphonation of polystyrene with $SO_3$, see U.S. Patents 2,604,456 and 2,533,210). It is also possible to start from the monomeric styrene sulphonic acid and to copolymerize this acid in water-soluble monomeric compounds in aqueous solution with potassium persulphate. (Preparation, U.S. Patents 2,837,500 and similarly also U.S. Patent 2,616,917.)

The first method has the advantage that compounds with any desired sulphonic acid content can be prepared. The $SO_3H$ content of the copolymers according to the invention should be between 15 and 60 percent, advantageously between 17 and 30 percent. The copolymers can also be substituted as desired after sulphonation. Thus, nitro groups and amino groups can be subsequently introduced.

The properties of the sulphonated copolymers can be varied by the nature and quantity of the second monomeric component, while maintaining the precipitation activity.

The effect produced by this process was quite unexpected, since hitherto, no flocculants apart from the aforementioned neutral salts and organic solvents have been known which are able to flocculate emulsions at the neutral point.

It is known that the $SO_3H$-groups of the polystyrene sulphonic acids of low molecular weight form a salt-like bond with the $NH_2$ groups of the gelatine. The solubility of the salt of high molecular weight is reduced by repressing the dissociation of the COOH-groups of the gelatine so that the salt precipitates at pH 4–5.

This insolubility already occurs above pH 6 with the sulphonated copolymers. For complete precipitation, the ratio between copolymer and gelatine can be varied within wide limits, since bases and acids of high molecular weight have ranges and not points of equivalence. The most favourable ratio is between 80–50 parts by weight of gelatine to 20–50 parts by weight of copolymer. Due to the fact that it is not necessary to change the pH value, the emulsions maintain their full sensitivity, freedom from fogging and gradation.

Those groups of the gelatine which are responsible for the photographic properties are thus not changed and blocked. The precipitation conditions can be modified as required.

Flocculations carried out at high temperatures produce solid coagulates, whereas finely granulated coagulates are obtained at low temperatures. More especially emulsions with low gelatine and high silver halide contents can be flocculated in this way. The coagulate can easily be washed out and the re-dispersion is effected by adding gelatine beyond the critical precipitation ratio, while heating to 40° C.

In addition, sulphonated copolymers show a better compatibility with the gelatine.

All tested emulsion receipes can be retained when using this method. The manufacture is simplified and made less costly. In general, the procedure followed is explained by reference to the following example:

The silver halide is precipitated in the usual manner in the gelatine. About 20–60 percent of a water-soluble salt of the sulphonated copolymer calculated on the amount of gelatine used is added dropwise or all at once as an aqueous solution to the said dispersion, which is cooled to 30° C. Suitable salts are: alkali metal salts, ammonium salts or alkaline earth salts. The emulsion quickly settles without adjustment of the pH value. After cooling to 12° C., the mixture is decanted and the remaining solid emulsion is washed with cold water and re-dispersed in an aqueous solution of additional gelatine, which is heated to 30–40° C. Ripening can be accomplished at any desired time, and conventional additives, such as sensitisers, stabilisers, hardeners, etc., can be added. Since the amount of gelatine being present during the precipitation of silver halide only makes up a fraction of the proportion of final gelatine, the emulsion ready for casting only contains moderate quantities of the sulphonated copolymer. With ammonia emulsions, it is advantageous to adjust the pH value to 7 before coagulation, since at high pH values, the quantities of copolymer must be increased. The method described can be used in order to produce emulsions with a high silver halide content.

It is particularly advantageous that the process according to the invention can also be used for the production of color photographic emulsions. The sulphonated copolymers are compatible with color coupling components, both when these are present in homogeneous phase and when they are embedded in finely dispersed form as a solution in a difficulty volatile organic crystalloid. The coupling components are not precipitated. The color coupling mechanism and the physical properties of the layers such as brittleness and the like are not impaired.

EXAMPLE 1

*Preparation of a sulphonated copolymer of vinyl pyrrolidone and styrene*

0.3 g. of the sodium salt of paraffin sulfonic acid and 0.03 g. of sodium phosphate are added to 60 cc. of water, heated to 60° C. 2 g. of potassium persulphate are then added. A mixture of 27 g. of styrene and 3 g. of vinyl pyrrolidone is added dropwise with stirring and at constant temperature.

Stirring is continued for 3 hours and the dispersion is precipitated with hydrochloric acid. After filtering and thorough washing with methanol, the coagulate is dissolved in benzene and precipitated with methanol. The operation is repeated. The resulting granulate is washed and dried. Yield 27 g. Nitrogen value 0.45 percent.

*Sulphonation*

50 cc. of concentrated sulphuric acid are heated to 120° C. and 5 g. of dry copolymer in powder form are slowly added thereto. Complete solution is obtained after one hour. The mixture is cooled and poured onto a little ice. The sulphonated copolymer precipitates and, after superficial washing with water, is dissolved in water at pH 8. Yield 25 g. The sulphonated copolymer can be completely freed from neutral salts by ion exchange or by dialysis.

*Flocculation of an emulsion*

A photographic emulsion is prepared from a mixing of the following solutions:

SOLUTION A 1 litre of water
19 g. of gelatine
130 g. of potassium bromide
1.2 g. of potassium iodide The solution is heated to 60° C.

SOLUTION B 1.2 litres of water
160 g. of silver nitrate

The solution is heated to 55° C.

Solution B is added while stirring to solution A. The mixture is cooled to 31° C. and 220 cc. of a 5 percent aqueous solution of the ammonium salt of the previously descrbed sulphonated copolymer are added. After a short time, the emulsion is deposited as a finely flocculated coagulate. The pH is 6–7. No adjustment to a determined pH value by addition of further compounds is necessary. The mixture is cooled and the solution is decanted. The coagulate is washed with cold water and thereafter redispersed at 40° C. with a solution of 150 g. of gelatine and 3.2 litres of water. The pH value does not have to be raised. Sensitization and ripening of the emulsion takes place in the usual manner. An emulsion is obtained which has the same photographic properties as the corresponding emulsion prepared in the usual manner. Furthermore, the physical properties of the dried emulsion have not been substantially modified. The precipitation pH values can be adjusted to 7, 8 or 9, if it appears advantageous for any reason. At higher pH-values the amounts of copolymer added must, however, be somewhat increased. The dried layers are completely clear after processing.

EXAMPLE 2

*Polymerization of methyl methacrylate with styrene*

A mixture of 40 g. of styrene and 4 g. of methyl methacrylate are added dropwise at 80° C. while stirring to a mixture of 120 cc. of water
0.6 g. of the sodium salt of paraffin sulphonic acid
0.06 g. of sodium phosphate
0.075 g. of potassium persulphate and the mixture is stirred for one hour at 80° C. The polymer is precipitated with dilute hydrochloric acid, washed with methanol and thereafter dried. Yield 43 g.

*Sulphonation with sulphur trioxide*

25 g. of sulphur trioxide are added dropwise at temperatures of between —2 to 0° C. and while stirring to a solution of 71 g. of 2,2'-dichlorodiethylether in 200 cc. of ethylene chloride. The mixture is then cooled to —15 to —20° C. and a solution of 10 g. of the above polymer in 80 cc. of ethylene chloride is then added dropwise in such a manner that the temperature of the mixture does not exceed —10° C. Thereafter, the temperature is permitted to rise over 3 hours to 15° C. The precipitated sulphonic acid is suction-filtered and washed with ethylene chloride. It is then dissolved in water and the adhering ethylene chloride is evaporated in vacuo. The solution is neutralised with sodium hydroxide solution. Yield 25 g. $SO_3H$ content 33 percent. The emulsion is prepared according to Example 5.

EXAMPLE 3

Polymerization is effected as indicated in Example 2, except that 6 g. of methyl methacrylate are added to 40 g. of styrene and 0.075 g. of potassium persulphate is used as catalyst. Yield 43 g.

The sulphonation is accomplished as described in Example 2. Yield 25 g. Content of $SO_3H$ groups 28 percent.

A photographic emulsion is prepared by combining the following solutions:

SOLUTION A 19 g. of gelatine
130 g. of potassium bromide and
1.2 g. of potassium iodide are dissolved in 1.1 litres of water.

SOLUTION B 160 g. of silver nitrate are dissolved in 1.2 litres of water.

The two solutions are heated to 55° C. and solution B is slowly introduced into solution A over 30 minutes with stirring. The mixture is cooled to 31° C. and 165 cc. of a 5 percent solution of the sodium salt of the sulphonated co-polymer described above are added. When the solution has a pH value of 7, a finely flocculated coagulate is immediately formed which precipitates in a short time. The mixture is cooled to 12° C. and the supernatant clear solution is poured off. The coagulate can be washed with cold water and is then re-dispersed with thorough stirring in a solution of 150 g. of gelatine in 2.5 litres of water at 45° C. Sensitization and ripening can take place in the usual manner. Conventional additives such as wetting agents, hardeners and the water for controlling the viscosity, can be added before casting. The physical properties of the layer prepared with the emulsion only differs slightly from those emulsions rinsed with water. The photographic properties, such as sensitivity, gradation and the like, are not changed. The layers are completely clear.

EXAMPLE 4

The precipitant in Example 3 is replaced by 140 cc. of a 5 percent solution of the sodium salt of the sulphonated co-polymer of Example 2. The emulsions prepared in this case have the same photographic properties as those obtained by conventional methods.

EXAMPLE 5

To 1 kg. of the emulsion prepared according to Example 1, there are added 13 g. of a water-soluble yellow color coupler and that quantity of water necessary for obtaining a viscosity suitable for casting. The color coupler has the formula:

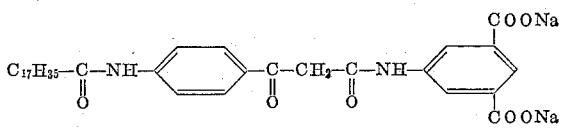

The physical and also the photographic properties of a layer prepared with this casting solution do not differ from those of the films prepared by conventional processes.

After being processed with color developers, a yellow colored image is obtained. The brittleness of such layers does not increase and the sensitivity is maintained with the same freedom from fogging. The layers are optically clear.

Instead of a yellow coupler, magenta or cyan couplers can be incorporated in the emulsion, so as to produce after usual processing magenta or cyan colored images. Accordingly these layers can be cast one upon another for the production of a multi-layer color photographic material.

EXAMPLE 6

*Polymerization of acrylonitrile with styrene*

To a solution of 120 cc. of water
0.6 g. of the sodium salt of paraffin sulfonic acid
0.06 g. of sodium phosphate
0.75 g. of potassium persulphate a mixture of 40 g. of styrene and 2 g. of acrylonitrile is added dropwise at 80° C. After a reaction time of 2 hours at 80° C., the polymer is precipitated with hydrochloric acid and washed with methanol. The yield after drying is 41 g.

*Sulphonation*

10 g. of $SO_3$ are slowly added dropwise at temperatures of between —2 to 0° C. while stirring to 71 g. of 2,2'-dichlorodiethyl ether and 200 cc. of dichlorethane. This mixture is cooled to —15 to —20° C. Thereafter, a solution of 10 g. of the above polymer in 80 cc. of ethylene chloride is added dropwise. The temperature of the mixture should not rise above —10° C. After the dropwise addition, the mixture is slowly heated within 3 hours to 15° C. The precipitated sulphonic acid is suction-filtered and washed with ethylene chloride. It is dissolved in water and neutralised after evaporation of the ethylene chloride. Yield: 20 g. 30 percent of $SO_3H$ groups.

The precipitant in Example 3 is replaced by 190 cc. of a 5 percent solution of the sodium salt of the above copolymer-sulphonic acid. The photographic properties of the emulsion are not changed.

EXAMPLE 7

*Polymerization of polystyrene with methacrylic acid and sulphonation of the copolymer*

The solution of 40 g. of styrene and 2 g. of methacrylic acid is added with vigorous stirring to a mixture of 120 cc. of water
0.6 g. of the sodium salt of paraffin sulfonic acid
0.06 g. of sodium phosphate and
0.1 g. of potassium persulphate The temperature of the mixture is kept at 80° C. while these substances are added dropwise. Thereafter, the mixture is kept for 1 hour at 80° C. The polymer is precipitated with hydrochloric acid and washed with methanol. After drying, a yield of 42 g. is obtained. The sulphonation is effected as indicated in Example 2, except that 30 g. of sulphur trioxide are used for sulphonating the above copolymer. Yield 20 g.

A photographic emulsion is prepared as follows:

SOLUTION A 20 g. of silver nitrate
60 cc. of water
20 cc. of ammonia solution (25 percent)

SOLUTION B 10 g. of gelatine
20 g. of potassium bromide
2 cc. of 10 percent potassium iodide solution
120 cc. of water Both solutions are heated to 50° C. and solution A is introduced dropwise into solution B over 5 minutes. After stirring for another 10 minutes, the emulsion is cooled to 35° C., substantially neutralised with about 35 cc. of 25 percent sulphuric acid and the pH value adjusted to 7 with dilute acetic acid. 75 cc. of a 5 percent solution of the potassium salt of the copolymer-sulphonic acid, as prepared above, are then added. Immediate flocculation of the emulsion occurs. The mixture is cooled to 12° C. and the coagulate is washed once or twice with cold water, after the aqueous salt solution has been removed by decantation. The coagulate is re-dispersed by adding a solution of 30 g. of gelatine in 800 cc. of water at 50° C. and the emulsion is ripened at the same temperature for 60 minutes. The emulsion obtained is clear and of medium sensitivity.

EXAMPLE 8

*Copolymerization of styrene and butylacrylate*

56 g. of styrene and 25 g. of butylacrylate are slowly added dropwise at 70° C. with stirring to a mixture of 120 cc. of water
0.6 g. of the sodium salt of paraffin sulfonic acid
0.06 g. of sodium phosphate
1 g. of potassium persulphate and the mixture is stirred for 3 hours. The copolymer is precipitated with 2 n-hydrochloric acid, suction-filtered and washed with methanol. For further purification, it is re-precipitated from benzene with methanol.

*Sulphonation*

20 g. of sulphur trioxide stabilised with HCl are added dropwise, with stirring and cooling with ice, to a mixture of 71 g. of 2,2′-dichloro-diethyl ether and 200 ml. of dichlorethane. Thereafter, the mixture is cooled to −15 to −20° C. Over a period of 30 minutes, 10 g. of the butylacrylate-styrene copolymer in 100 cc. of dichlorethane are introduced dropwise at −10° C. and the temperature is raised over a period of 1½ hours to 20° C. The precipitated sulphonated copolymer is suction-filtered and washed with dichlorethane. Consumption of 0.1- NaOH solution per 0.5 g. of sulphonated copolymer: 32.4 cc., corresponding to 0.65 percent of acidic hydrogen.

*Precipitation of an emulsion*

1 litre of an emulsion prepared at 50° C. from the following solutions:

SOLUTION A 12 g. of gelatine
80 g. of KBr
4 g. of potassium iodide
600 cc. of water

SOLUTION B 95 g. of silver nitrate
720 cc. of water is mixed at pH 6–7 with 125 cc. of a 5 percent aqueous solution of the sodium salt of the sulphonated butylacrylate styrene copolymer thereby forming finely flocculated coagulate.

The mixture is cooled to 12° C., the supernatant liquid is poured off and the coagulate washed with cold water.

The coagulate is re-dispersed by addition 120 g. of gelatine in 1.5 litres of water at 40–50° C. The photographic properties of this emulsion do not differ from those of corresponding emulsions prepared in the usual manner.

EXAMPLE 9

*Preparation of a sulphonated copolymer of styrene and acrylic acid*

A mixture of 120 cc. of water, 0.6 g. of the sodium salt of paraffin sulphonic acid, 0.06 g. of sodium phosphate and 0.6 g. of potassium persulfate is added dropwise with vigorous stirring at a temperature of 80° C. to a mixture of 60 g. of styrene and 4 g. of acrylic acid. Stirring is continued for 3 hours at the same temperature. Thereafter, the polymerizate is precipitated with hydrochloric acid, washed with methanol and dried. Yield 38 g.

The sulphonation is accomplished according to Example 2. Yield 37 g. of the sodium salt of the sulphonated compound.

A silver halide gelatine emulsion is prepared according to Example 8 except that the emulsion is flocculated with 100 cc. of a 5 percent aqueous solution of the sodium salt described above. The photographic properties of the resulting emulsion do not differ from those of an emulsion prepared in the usual manner.

EXAMPLE 10

30 g. of styrene and 33 cc. of a 12 percent aqueous solution of acryl amide (=4 g. of acryl amide) are added dropwise simultaneously but separately at a temperature of 70–75° C. with vigorous stirring to a mixture of 60 cc. of water, 0.3 g. of the sodium salt of paraffin sulphonic acid, 0.03 g. of sodium phosphate and 0.3 g. of potassium persulfate. Stirring is continued for 2 hours at 70° C. After cooling the polymerization is precipitated with hydrochloric acid, washed with methanol and dried. Yield 27 g.

43 g. of sulphur trioxide stabilised with HCl are added dropwise, with stirring and cooling with ice, to a mixture of 105 g. of 2,2′-dichloro-diethyl ether and 300 ml. of dichlorethane. Thereafter, the mixture is cooled to −16 to −20° C. Over a period of 1 hour, 10 g. of the copolymer described above in 100 cc. of dichlorethane are added dropwise at −16° C. and the temperature is raised over a period of 2 hours to 20° C. The precipitated sulphonated copolymer is suction-filtered and washed with dichlorethane and ether. Yield 25 g. $SO_3H$ content 44.5 percent.

The preparation of an emulsion is accomplished according to Example 9 using 100 cc. of a 5 percent aqueous solution of a sodium salt of the sulphonated copolymer of styrene and acrylic amide described above.

Having thus described our invention, we now state that we believe the invention to be capable of numerous variations in method, apparatus and material. For example the method according to our invention is not limited to those silver halide emulsions previously mentioned but can be used for any silver halide emulsions such as silver chloride, bromide, iodide or mixtures thereof.

The sulphonated copolymers according to the invention may be used in form of the ammonium-, alkylammonium-, sodium-, potassium-, magnesium- or calcium-salt.

What is claimed is:

1. A process for the production of a photographic emulsion which comprises coagulating (i) a dispersion of light-sensitive silver halide particles in an aqueous solution of gelatin by the addition thereto of (ii) an aqueous solution of a water-soluble salt of a sulfonated copolymer of styrene and a monomer of the group consisting of acrylic and methacrylic acids, esters of acrylic and methacrylic acids with aliphatic alcohols, acrylamide and methacrylamide, acrylonitrile and methacrylonitrile, and vinylpyrrolidone, the sulfonated copolymer containing between 15 and 60 percent by weight of sulfo radicals and being formed by sulfonation of a copolymerized mixture consisting of between 70 and 97 percent by weight of styrene and between 3 and 30 percent by weight of one of the other specified monomers, separating the coagulum from the mixture, washing it with water, and redispersing it in another aqueous solution of gelatin.

2. A process as defined in claim 1 in which the pH of the solutions during mixing is maintained between 6.0 and 9.0.

3. A process as defined in claim 1 in which the sulfonated copolymer was formed by sulfonation of a copolymerized mixture consisting of between 85 and 97 percent by weight of styrene and between 3 and 15 percent by weight of one of the other specified monomers.

4. A process as defined in claim 1 in which the sulfonated copolymer contains between 17 and 30 percent by weight of sulfo radicals.

5. A process as defined in claim 1 in which the ratio of the volume of the dispersion of silver halide particles in the aqueous gelatin solution (i) to the volume of the aqueous solution of the water-soluble salt of the sulfonated copolymer of styrene and the other monomer (ii) is such that the mixture contains between 80 and 50 parts by weight of gelatin to between 20 and 50 parts by weight of the copolymer.

6. A process as defined in claim 1 in which the water-soluble salt of the sulfonated copolymer of styrene and other monomer is a water-soluble sulfonated copolymer having a molecular weight between 30,000 and 60,000.

7. A process as defined in claim 1 in which the water-soluble salt of the sulfonated copolymer of styrene and other monomer is a water-soluble sulfonated copolymer of styrene and vinyl pyrrolidone.

8. A process as defined in claim 1 in which the water-soluble salt of the sulfonated copolymer of styrene and other monomer is a water-soluble sulfonated copolymer of styrene and acrylonitrile.

9. A process as defined in claim 1 in which the water-soluble salt of the sulfonated copolymer of styrene and other monomer is a water-soluble sulfonated copolymer of styrene and methyl methacrylate.

References Cited in the file of this patent
UNITED STATES PATENTS

| | | |
|---|---|---|
| 2,533,210 | Baer | Dec. 12, 1950 |
| 2,565,418 | Yackel | Aug. 21, 1951 |
| 2,772,165 | Moede | Nov. 27, 1956 |
| 2,863,769 | Moede | Dec. 9, 1959 |